(12) United States Patent
Yoshida

(10) Patent No.: US 8,568,008 B2
(45) Date of Patent: Oct. 29, 2013

(54) PRISM EQUIPPED ILLUMINATION UNIT FOR VEHICLE

(75) Inventor: Haruki Yoshida, Makinohara (JP)

(73) Assignee: Yazaki Corporation, Tokyo (JP)

( * ) Notice: Subject to any disclaimer, the term of this patent is extended or adjusted under 35 U.S.C. 154(b) by 108 days.

(21) Appl. No.: 12/688,096

(22) Filed: Jan. 15, 2010

(65) Prior Publication Data

US 2010/0195343 A1    Aug. 5, 2010

(30) Foreign Application Priority Data

Feb. 5, 2009   (JP) ................................. 2009-025014

(51) Int. Cl.

| | |
|---|---|
| F21V 7/04 | (2006.01) |
| F21V 5/00 | (2006.01) |
| F21V 9/00 | (2006.01) |
| F21V 3/00 | (2006.01) |
| H01L 33/00 | (2010.01) |
| E04D 13/00 | (2006.01) |
| E04H 15/10 | (2006.01) |
| E05B 17/10 | (2006.01) |
| F21S 4/00 | (2006.01) |
| G09F 13/26 | (2006.01) |
| B60Q 1/00 | (2006.01) |
| B60Q 1/26 | (2006.01) |

(52) U.S. Cl.
USPC ........... 362/555; 362/576; 362/488; 362/490; 362/511; 362/311.02

(58) Field of Classification Search
USPC .............. 362/555, 488, 490, 511, 85, 311.02, 362/551
See application file for complete search history.

(56) References Cited

U.S. PATENT DOCUMENTS

| | | | | |
|---|---|---|---|---|
| 1,514,653 | A | * | 11/1924 | Cardwell ...................... 359/528 |
| 1,936,297 | A | * | 11/1933 | Field ............................. 362/287 |
| 6,283,621 | B1 | * | 9/2001 | Macri ........................... 362/488 |
| 6,394,611 | B1 | * | 5/2002 | Wang et al. .................. 353/119 |
| 6,948,838 | B2 | * | 9/2005 | Kunstler ....................... 362/545 |
| 7,186,012 | B2 | * | 3/2007 | Schevardo et al. ............ 362/555 |
| 7,215,863 | B1 | * | 5/2007 | Arenella et al. .............. 385/133 |

(Continued)

FOREIGN PATENT DOCUMENTS

| | | |
|---|---|---|
| CN | 101566314 A | 10/2009 |
| DE | 10331075 A1 | 10/2005 |

(Continued)

OTHER PUBLICATIONS

Office Action dated Sep. 6, 2012 issued by the German Patent and Trademark Office in counterpart German Application No. 10 2010 001 526.1.

(Continued)

*Primary Examiner* — Jong-Suk (James) Lee
*Assistant Examiner* — Bryon T Gyllstrom
(74) *Attorney, Agent, or Firm* — Sughrue Mion, PLLC

(57) ABSTRACT

An illumination unit for a vehicle comprising: a light emitting element; an outer housing including an opening, on which the light emitting element is mounted; a prism disposed between the light emitting element and the opening, the prism including a tip portion which is disposed at the opening, a body portion which continues from the tip portion, a flange portion which continues from the body portion, and a stage at a boundary between the tip portion and the body portion.

10 Claims, 4 Drawing Sheets

(56) References Cited

U.S. PATENT DOCUMENTS

| | | | |
|---|---|---|---|
| 7,370,995 B2* | 5/2008 | Hein et al. | 362/511 |
| 7,422,352 B2* | 9/2008 | Sakakibara | 362/490 |
| 7,775,693 B2* | 8/2010 | Kracker | 362/488 |
| 2005/0007791 A1 | 1/2005 | Helbach et al. | |
| 2005/0018439 A1 | 1/2005 | Schevardo et al. | |
| 2006/0245200 A1* | 11/2006 | Kuwana et al. | 362/488 |
| 2006/0291224 A1* | 12/2006 | England et al. | 362/490 |
| 2007/0014121 A1* | 1/2007 | Yepes Gomez | 362/486 |
| 2007/0195548 A1* | 8/2007 | Wang | 362/555 |
| 2007/0236956 A1* | 10/2007 | Kolodin et al. | 362/555 |
| 2009/0262537 A1* | 10/2009 | Liao | 362/257 |
| 2010/0165622 A1 | 7/2010 | Geudner et al. | |

FOREIGN PATENT DOCUMENTS

| | | |
|---|---|---|
| DE | 102007029140 A1 | 2/2009 |
| JP | 5-012282 U | 2/1993 |
| JP | 2008-120210 A | 5/2008 |

OTHER PUBLICATIONS

Office Action dated Dec. 4, 2012 issued by the State Intellectual Property Office of the People's Republic of China in counterpart Chinese Application No. 201010100035.4.

Office Action dated Feb. 26, 2013, issued by the Japanese Patent Office in counterpart Japanese Patent Application No. 2009-025014.

* cited by examiner

US 8,568,008 B2

PRISM EQUIPPED ILLUMINATION UNIT FOR VEHICLE

REFERENCE TO RELATED APPLICATIONS

This application claims priority from Japanese Patent Application No. 2009-025014 filed on Feb. 5, 2009 and the entire subject matter of which is incorporated herein by reference.

TECHNICAL FIELD

The present invention relates to an illumination unit for a vehicle, and particularly relates to an illumination unit for a vehicle which is equipped with a down light prism.

BRIEF DESCRIPTION OF RELATED ARTS

A related illumination unit for a vehicle described in JP-U-H05-12282 is aimed at outputting spindly spot light and preventing glare. For this purpose, the related illumination unit includes a cover having a slit and a lens having a convex portion. Since the convex portion of the lens is inserted into the slit of the cover, light emitted from a light source passes the convex portion and is output as the spindly spot light from a designed surface. Also, the related illumination unit includes a light diffusive element provided on an outer surface of the convex potion and an inner surface of the slit in order to prevent glare.

The related illumination unit, however, requires a short distance between the light source and the lens. On the other hand, in a case where the light source is mounted on a substrate, a distance between the light source and the designed surface becomes long. That is why the light source is not able to be mounted on the substrate in the related art.

The applicant conceived another related illumination unit in order to address the above described problem. FIG. 3 is an expanded perspective view of the related illumination unit for a vehicle. In this related illumination unit, a light source is able to be mounted on a substrate by extending the distance between the light source and a lens with a prism. The related illumination unit 100 includes a substrate 20, a down light prism 35, an outer housing 45, and a tripled switch knob 50 in this order from upside. The substrate 20, the down light prism 35 (herein after referred to as prism), and the tripled switch knob 50 are mounted on the outer housing 45. On the substrate 20, a light emitting element 20L (in this example, a light emitting diode: LED) is mounted.

In a case where the LED 20L is mounted on the substrate 20, the LED 20L is mounted with switches or the like. Since the switches are larger in size than LED 20L, a position of the LED 20L on the substrate 20 is distant from a designed surface where an emission hole is provided. Therefore, the prism 35 guides the light emitted from LED 20L to the emission hole in order to downsize the emission hole.

However, according to the result of industrious inspections with respect to the above described related illumination unit in which the prism guides the emitted light, the applicant found that there is an illumination unevenness in the illuminated area due to light directed in an unexpected direction.

SUMMARY

The present invention addresses the above described problem. For a prism equipped illumination unit in which an LED is mounted on the substrate and the prism guide the light emitted from a LED, the present invention prevents the light from directing in an unexpected direction and thereby prevents an illumination unevenness in the illuminated area.

An exemplary embodiment of the present invention is An illumination unit for a vehicle including a light emitting element; an outer housing including an opening, on which the light emitting element is mounted; a prism disposed between the light emitting element and the opening, the prism including a tip portion which is disposed at the opening, a body portion which continues from the tip portion, a flange portion which continues from the body portion, and a stage at a boundary between the tip portion and the body portion.

According to the above described embodiment of the present invention, since light reflected by the prism at the stage does not direct toward the opening, the light directed in an unexpected direction can be prevented. Thus, the illumination unevenness can be prevented. Also, since the shape of the prism enables worker to easily handle the prism, workability is improved as compared to a small cylindrical prism of the related art.

According to another aspect of the embodiment, the stage of the prism has a rectangular box shape. By virtue of the rectangular box shape, the prism does not roll even if put on an inclined place. Therefore, the workability during assembling of the illumination unit is improved.

According to another aspect of the embodiment, the integral molding of the prism makes it easy to form the prism for preventing random reflection.

DETAIL DESCRIPTION OF THE EXEMPLARY EMBODIMENT

Below the exemplary embodiment of the present invention is explained with reference to the drawings.

<The Origin of the Illumination Unevenness in the Illuminated Area of the Related Art>

Figure 3:
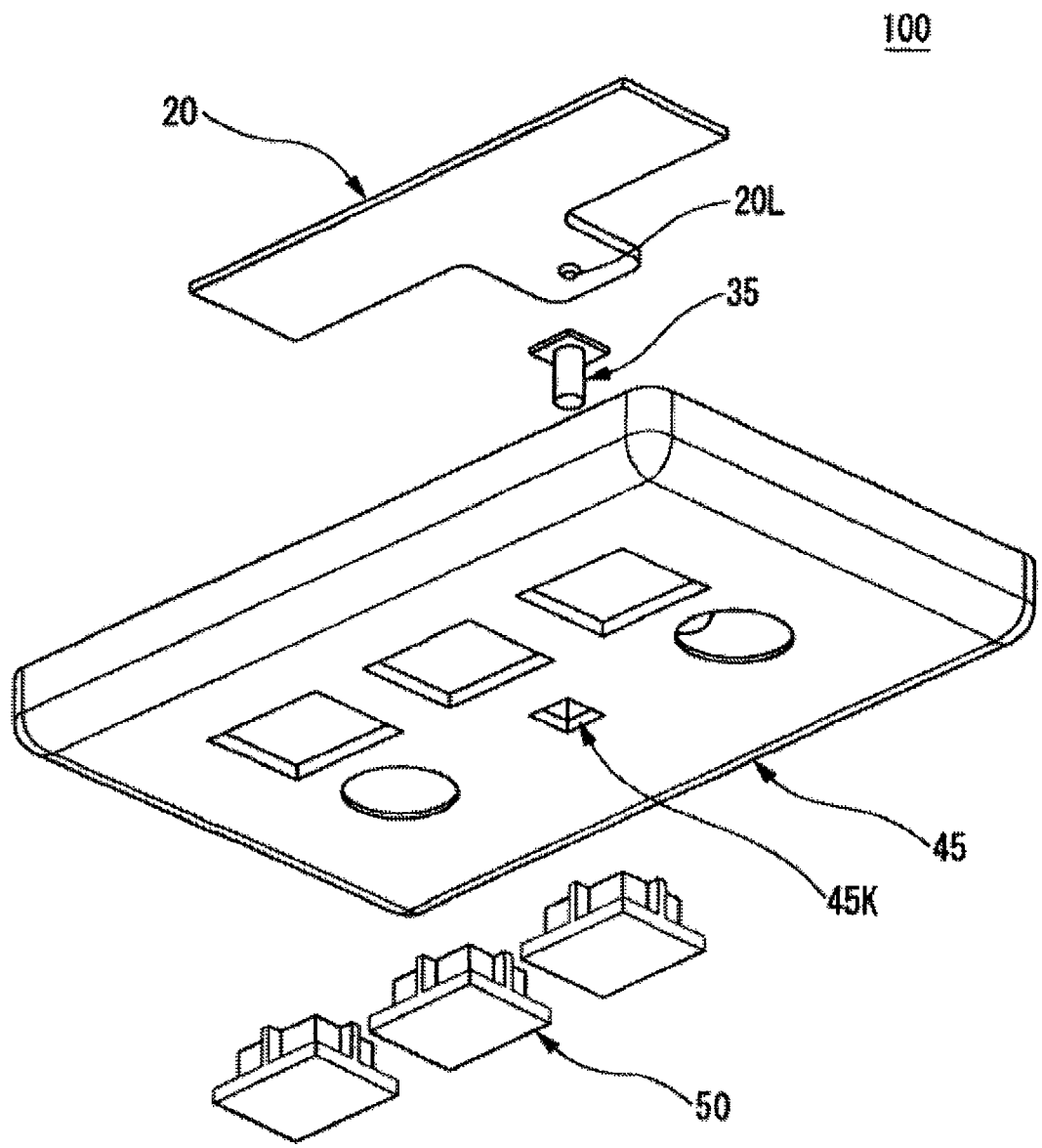
FIG. 3 is an exploded perspective view of a related illumination unit for a vehicle.

Industrious examinations performed by the applicant revealed that an origin of the illumination unevenness in the illuminated area is a shape of a prism used for the related illumination unit shown in FIG. 3. The mechanism is explained with reference to FIG. 4.

Figure 4:
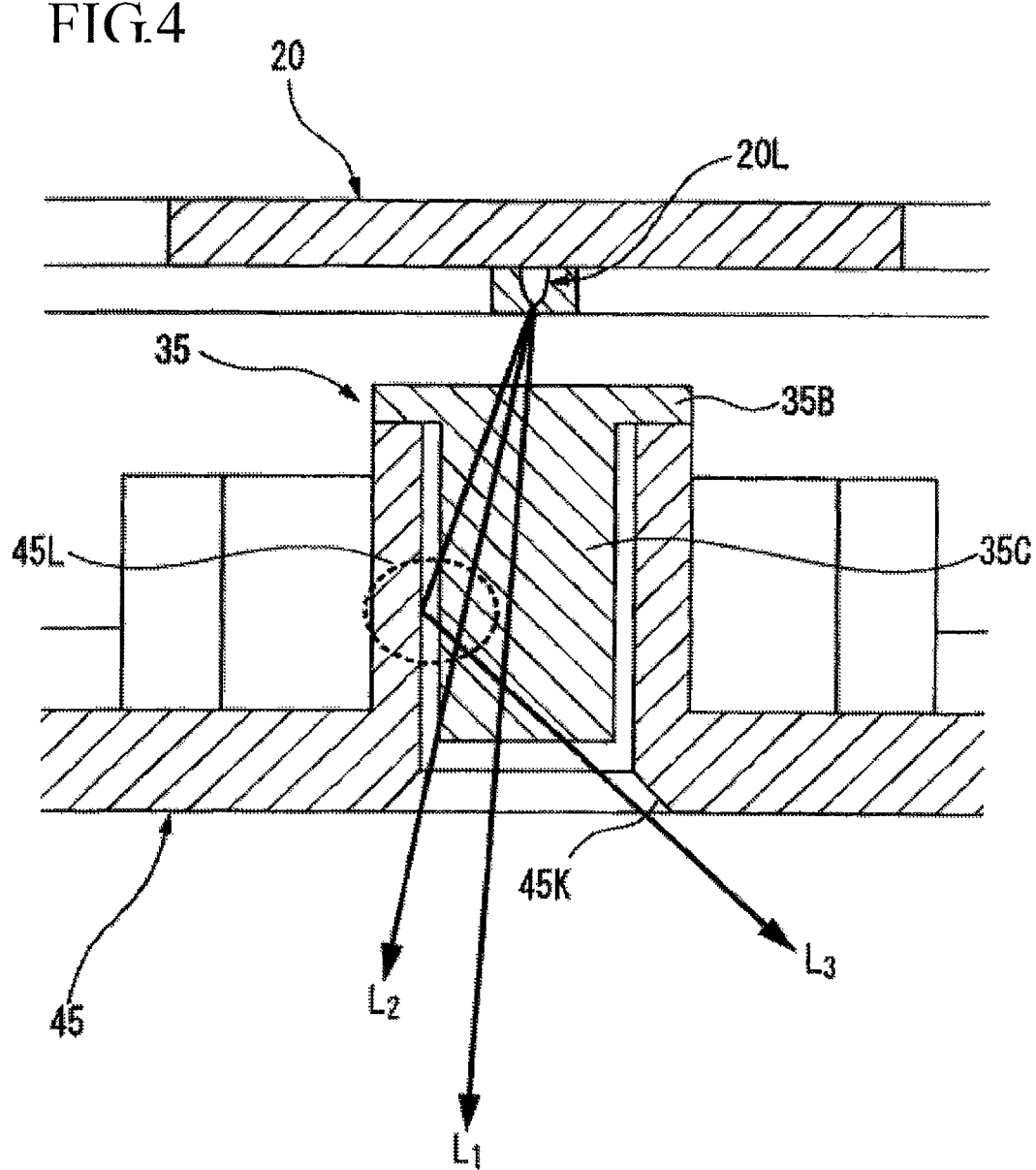
FIG. 4 is a vertical-section of the assembled illumination unit shown in FIG. 3 passing the prism.

FIG. 4 is a vertical-section of the assembled illumination unit shown in FIG. 3. The vertical-section passes the prism. In FIG. 4, three lines L1-L3 shows light L1 to L3 emitted from a light emitting diode (LED) 20L. The downwardly directed light L1 passes the prism 35 from the upside to the downside and is output from the opening 45K of the outer housing 45 to a predetermined illuminated area. The inclined light L2 barely passes the prism 35 from the upside to the downside and is output from the opening 45K of the outer housing 45 to a predetermined illuminated area. The light L3 which is emitted in a direction largely inclined to the prism 35 as compared to light L2 is in a different situation. Although the light L3 is input the prism from the upside, the light L3 is reflected at side surface 45 L of the cylindrical prism 35. Then the Light L3 is output from the opening 45K of the outer housing 45 while crossing the corner of the opening 45K with a large angle. Therefore, the light L3 is output in a direction totally different from the direction toward the predetermined illuminated area. That is the light L3 is deviated light.

Thus the origin of the illumination unevenness in the illuminated area is the deviation of light guided by the prism 35 in an unexpected direction due to the reflection at the side surface of the prism 35.

<The Shape of the Prism Used in the Exemplary Embodiment>

The shape of the prism 30 used for the exemplary embodiment of the present invention is explained below.

Figure 1:
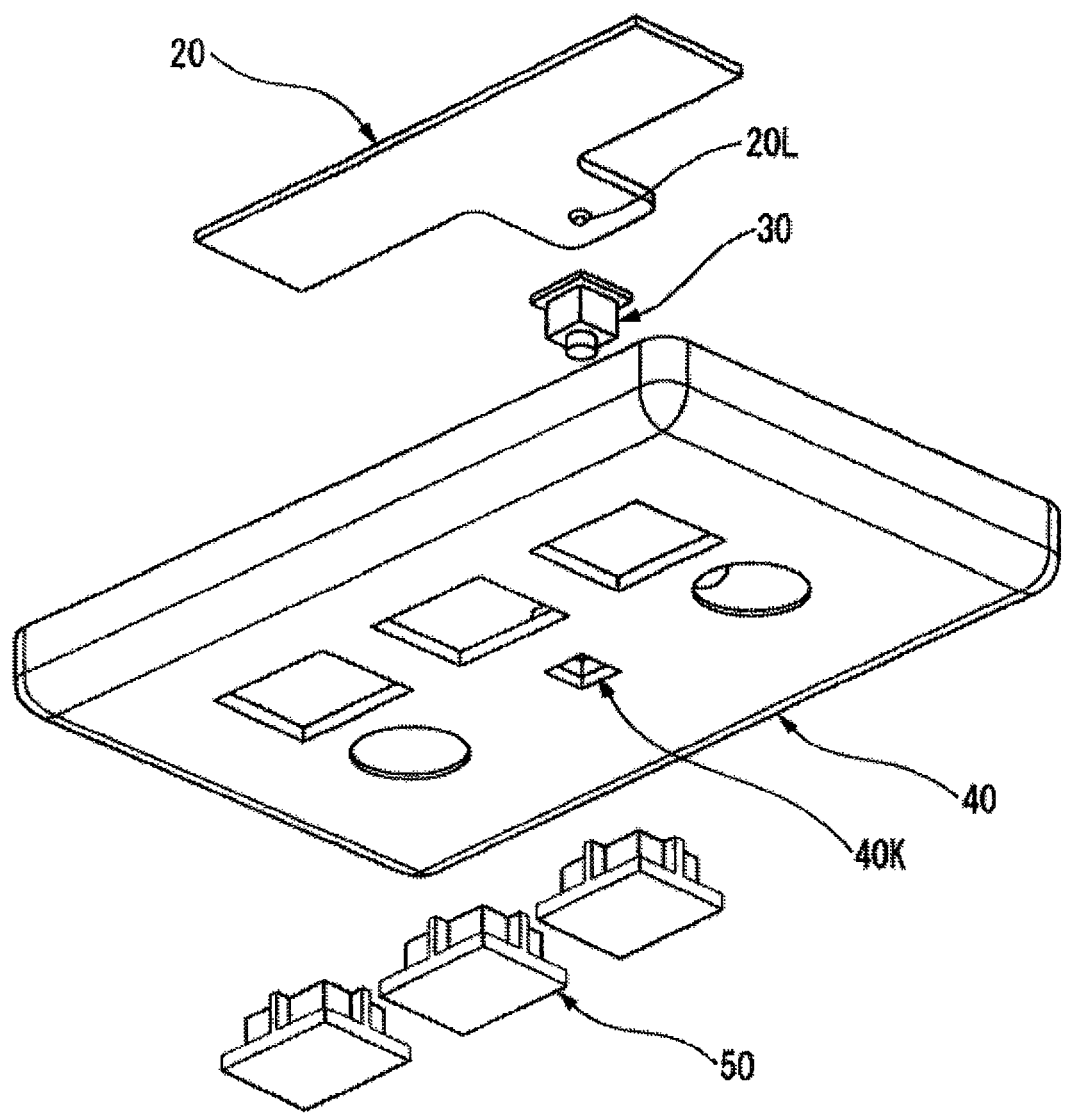
FIG. 1 is an exploded perspective view of an exemplary embodiment of an illumination unit for a vehicle according to the present invention.
Figure 2:
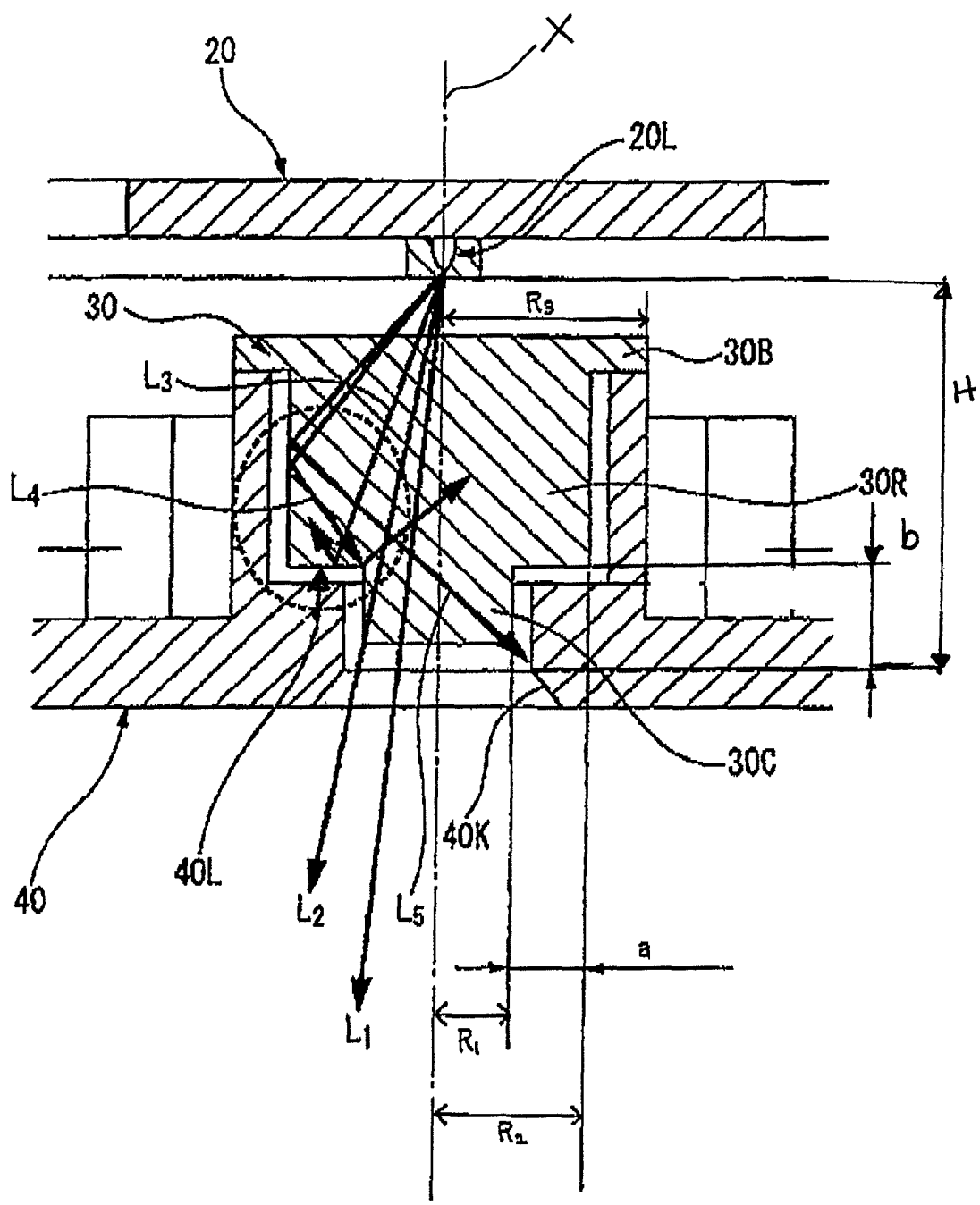
FIG. 2 is a vertical-section of the assembled illumination unit shown in FIG. 1. The vertical-section passes the prism.

FIG. 2 is a vertical-section of the assembled illumination unit shown in FIG. 1. The vertical section passes the prism. The prism 30 includes a tip portion 30c, a body portion 30R, and a flange portion 30B. The tip portion 30C is positioned in the vicinity of an opening 40K of an outer housing 40. In the exemplary embodiment the tip portion 30C has a cylindrical shape. The body portion 30R continues from the tip portion 30C so that a boundary between the body portion 30R and the tip portion 30C has a stage 40L. In the exemplary embodiment, the body portion 30R has a rectangular box shape. The stage 40L has a predetermined width "a" and a predetermined height "b" as indicated in FIG. 2. The flange portion 30B continues from a side of the body portion 30R facing to a light emitting element 20L. The flange portion 30B is used for assembling the prism 30 to the outer housing 40. Since the tip portion 30C, the body portion, and the flange portion 30B are integrally formed from same resin material, the manufacturing cost for the prism 30 is not so high. Therefore, the manufacturing of the prism 30 is easy.

In this exemplary embodiment, the stage at the boundary between the body portion 30R and the tip portion 30C is configured that the width "a" is larger than a half of a distance between the side surface of the body portion and an axis "X" through the LED 20L and a center of the opening 40K. Also, it may be possible to configure the stage so that the height "b" is larger than a quarter of a distance "H" between the LED 20L and the opening 40K.

<The Reason why the Illumination Unevenness in the Illuminated Area is Prevented in the Exemplary Embodiment>

Next, the reason why the illumination unevenness in the illuminated area is prevented in the exemplary embodiment using the prism 30 is explained in below. In FIG. 2, lines L1-L5 shows light L1~L5, each of which are emitted from the light emitting diode (LED) 20L in each different directions. The downwardly directed light L1 passes the prism 30 from the upside to the downside and is output from the opening 40K of the outer housing 40 to a predetermined illuminated area. The inclined light L2 barely passes the prism 30 from the upside to the downside and is output from the opening 40K of the outer housing 40 to a predetermined illuminated area.

In contrast, the light L3-L5 reaching the stage 40L are transmitted in the following manner. The light L3 output in an inclined direction reaches the stage 40L of the prism 30. The light L3 is reflected at the stage 40L and directed in an upward direction. Thus, the light L3 is not directed in the direction toward the opening 40K. Therefore, even if light guided by the prism 30 is reflected in the prism 30, the light is not output from the opening 40K. That is the reason why the illumination unevenness in the illuminated area is prevented.

The light L4, which is output in more inclined direction than the inclined direction of the light L3, reaches the side surface of the body portion 30R. The light L4 is reflected at the side surface and is directed in a downward direction so as to reach the stage 40L. Then, the light L4 is reflected at the stage 40L and is directed in an upward direction. Thus, as same as the light L3, the light L4 is not output from the opening 40K. Therefore, the illumination unevenness in the illuminated area is prevented.

The light L5, which is output in more inclined direction than the inclined direction of the light L4, reaches the side surface of the body portion 30R. The light L5 is reflected at the side surface and is directed in a downward direction. After that, the light L5 reaches a side surface of the outer housing 40 and is absorbed by the outer housing 40. Thus, the light L5 is not output from the opening 40K. Therefore, the illumination unevenness in the illuminated area is prevented.

As described above, even though the light L3-L5, each of which is emitted from LED 20L in an inclined direction, reach the stage 40L of the prism 30, the light L3-L5 are not directed in a direction toward the opening 40K of the outer housing 40K. Therefore, the illumination unevenness is prevented.

Additional Modifications

Although the body portion 30R of the exemplary embodiment has a rectangular box shape, the body portion 30R may have a cylinder shape. In this configuration, the prism includes a first portion 30C of a first radius R1, a second portion 30R of a second radius R2, and a third portion 30B of a third radius R3. The first, second, and third radiuses are different from each other. The stage 40L is, for example, formed at a boundary between the first and the second portion because of the radiuses difference. Preferably, the difference is determined so that the difference between the first R1 and the second R2 radiuses is larger than a half of a distance between a side surface of the second portion and an axis of the cylindrical prism.

While the present invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An illumination unit for a vehicle comprising:
   a light emitting element;
   an outer housing including an opening, on which the light emitting element is mounted;
   a prism disposed between the light emitting element and the opening, for receiving light emitted from the light emitting element, the prism including a tip portion which is disposed at the opening, a body portion which continues from the tip portion and having a width larger than a width of the tip portion, a flange portion which continues from the body portion, having a width larger than the width of the body portion, and a stage at a boundary between the tip portion and the body portion, the stage having a surface orthogonal to a side surface of the body portion,
   wherein a portion of the light emitted from the light emitting element is reflected by the stage, away from the opening, so as not to be output through the opening.

2. The illumination unit for a vehicle according to claim 1, wherein the stage is configured to reflect the portion of the light, which is reflected from the stage, toward the side surface of the body portion.

3. The illumination unit for a vehicle according to claim 2, wherein the prism has a cylindrical shape.

4. The illumination unit for a vehicle according to claim 2, wherein a height of the stage is larger than a quarter of a distance between the opening and the light emitting element.

5. The illumination unit for a vehicle according to claim 2, wherein a width of the stage is larger than a half of a distance between the side surface of the body portion and an axis through the light emitting element and a center of the opening.

6. The illumination unit for a vehicle according to claim 1, wherein the body portion has a rectangular box shape.

7. The illumination unit for a vehicle according to claim 1, wherein the prism is formed integrally from a same resin.

8. The illumination unit according to claim 1, wherein another portion of the light emitted from the light emitting element is reflected by an area of the side surface of the body portion directly to an area of the stage, the area of the side surface and the area of the stage being disposed on a same side of an axis through the light emitting element and a center of the opening.

9. An illumination unit for a vehicle comprising:
   a light emitting element;
   an outer housing including an opening, on which the light emitting element is mounted;
   a cylindrical prism, formed of resin, disposed between the light emitting element and the opening, the prism including a first portion of a first radius, a second portion of a second radius, and a third portion of a third radius,
   wherein the first, the second, and the third radiuses are different from each other, so as to form a stage at a portion of the prism at which two of the first, the second, and the third portions meet, and
   wherein the first portion, the second portion and the third portion are entirely disposed between the light emitting element and the opening, and
   wherein light emitted from the light emitting element is reflected by the stage in a direction away from the opening so as not to be emitted through the opening, and
   wherein the stage has a surface orthogonal to a side surface of the second portion.

10. The illumination unit according to claim 9, wherein one of the differences between the first, second, and third radiuses is larger than a half of a distance between a side surface of the second portion and an axis of the cylindrical prism.

* * * * *